(12) United States Patent
Kim et al.

(10) Patent No.: US 8,090,030 B2
(45) Date of Patent: Jan. 3, 2012

(54) METHOD, APPARATUS AND SYSTEM FOR GENERATING AND FACILITATING MOBILE HIGH-DEFINITION MULTIMEDIA INTERFACE

(75) Inventors: Gyudong Kim, Sunnyvale, CA (US); Baegin Sung, Sunnyvale, CA (US); Hoon Choi, Mountain View, CA (US)

(73) Assignee: Silicon Image, Inc., Sunnyvale, CA (US)

( * ) Notice: Subject to any disclaimer, the term of this patent is extended or adjusted under 35 U.S.C. 154(b) by 1035 days.

(21) Appl. No.: 11/969,847

(22) Filed: Jan. 4, 2008

(65) Prior Publication Data
US 2009/0178097 A1    Jul. 9, 2009

(51) Int. Cl.
*H04N 11/02* (2006.01)
(52) U.S. Cl. .................................................. 375/240.28
(58) Field of Classification Search .................. 375/240, 375/240.01, 240.16, 240.28; 370/328–339, 370/466, 532–541; 348/14.01, 14.02
See application file for complete search history.

(56) References Cited

U.S. PATENT DOCUMENTS

| | | | |
|---|---|---|---|
| 5,210,846 A | 5/1993 | Lee | |
| 5,239,732 A | 8/1993 | Steven | |
| 5,579,299 A | 11/1996 | Halter et al. | |
| 5,729,547 A | 3/1998 | Dute | |
| 6,112,275 A | 8/2000 | Curry et al. | |
| 6,532,506 B1 | 3/2003 | Dunstan et al. | |
| 6,697,897 B1 | 2/2004 | Friel et al. | |
| 7,181,557 B1 | 2/2007 | Falik et al. | |
| 7,187,307 B1 | 3/2007 | Schmidt et al. | |
| 2004/0015570 A1 | 1/2004 | Daum et al. | |
| 2004/0218599 A1 | 11/2004 | Kobayashi | |
| 2005/0063707 A1* | 3/2005 | Imai | 398/141 |
| 2005/0185720 A1 | 8/2005 | Kwok | |
| 2006/0209745 A1* | 9/2006 | MacMullan et al. | 370/328 |
| 2007/0073449 A1 | 3/2007 | Kraemer et al. | |
| 2007/0083692 A1 | 4/2007 | Liu et al. | |
| 2007/0201492 A1 | 8/2007 | Kobayashi | |
| 2007/0279408 A1 | 12/2007 | Zheng et al. | |
| 2007/0286246 A1 | 12/2007 | Kobayashi | |
| 2008/0084834 A1* | 4/2008 | Stanek | 370/284 |
| 2008/0315943 A1 | 12/2008 | Underhill | |

(Continued)

FOREIGN PATENT DOCUMENTS

EP    1473701    11/2004

(Continued)

OTHER PUBLICATIONS

"PCT ISR WO Mailed Mar. 25, 2009 for PCT/US2008/085287", (Mar. 25, 2009), Whole Document.

(Continued)

*Primary Examiner* — Frank Duong
(74) *Attorney, Agent, or Firm* — Blakley, Sokoloff, Taylor & Zafman LLP

(57) ABSTRACT

A method, apparatus and system are provided for generating and facilitating Mobile High-Definition Multimedia Interface. In one embodiment, an apparatus includes a transmitter configured to merge multiple channels of a high-definition interface into a single channel to generate a mobile high-definition interface, the mobile high-definition interface configured to facilitate carrying of high-definition media content in a mobile device. The apparatus further includes a receiver coupled with the transmitter, the receiver configured to receive the single channel, and to unmerge the single channel into the multiple channels.

25 Claims, 9 Drawing Sheets

U.S. PATENT DOCUMENTS

| | | | |
|---|---|---|---|
| 2009/0046690 A1* | 2/2009 | Hsieh | 370/342 |
| 2009/0067488 A1* | 3/2009 | Skeels et al. | 375/240.01 |
| 2009/0083825 A1* | 3/2009 | Miller et al. | 725/151 |
| 2009/0177818 A1 | 7/2009 | Shim et al. | |

FOREIGN PATENT DOCUMENTS

| | | |
|---|---|---|
| EP | 1519581 | 3/2005 |
| GB | 2425696 | 11/2006 |

OTHER PUBLICATIONS

"High-Definition Multimedia Interface Specification Version 1.3", *Internet Citation XP002391813*—http://www.hdmi.org/download/HDMI_Spec_1.3_GMI.pdf, (retrieved on Jul. 26, 2006), Whole Document.

International Searching Authority, *International Search Report and Written Opinion* for International Application No. PCT/US2008/85288 mailed Mar. 9, 2009, Whole Document.

USPTO, Non-Final Office Action for U.S. Appl. No. 11/969,852 mailed Sep. 25, 2009.

Non-Final Office Action for U.S. Appl. No. 11/969,865 mailed Oct. 28, 2009.

USPTO, Notice of Allowance for U.S. Appl. No. 11/969,852 mailed Apr. 8, 2010.

USPTO, Notice of Allowance for U.S. Appl. No. 11/969,865 mailed May 11, 2010.

"1-Wire Extended Network Standard", *MAXIM*, Application Note 3925, Oct. 26, 2006, pp. 1-5, www.maxim-ic.com/an3925.

"1-Wire Products Design Guide", *MAXIM*, 4th Edition, Feb. 2009, pp. 1-8, www.maxim-ic.com/yes.

"4Kb Plus Time Memory iButton", *Dallas Semiconductor/MAXIM*, DS1994, Nov. 2009, pp. 1-23 www.maxim-ic-com.

"PCT ISR and WO Mailed Mar. 13, 2009 for PCT/US2008/086879", Whole Document.

"Advanced 1-Wire Network Driver", *Application Note 244, Maxim Integrated Products*, May 30, 2003, pp. 1-13.

"EconoRAM Time Chip", *Dallas Semiconductor*, DS2404, Jan. 22, 2007, pp. 1-29 www.maxim-ic.com.

"Guidelines for Reliable 1-Wire Networks", *Application Note 148, Dallas Semiconductor/Maxim*, Jun. 19, 2002, pp. 1-21.

"High-Definition Multimedia Interface Specification Version 1.3a", Nov. 10, 2006, cover page and page 1 of 156 pages only.

"Lindy Announce Mini HDMI Adapter for Camcorders and Notebooks", *HDTV UK.*, Online Sep. 28, 2007, Retrieved from Internet Sep. 23, 2009 <http://www.hdtvuk.tv/2007/09/lindy_announce_1.html>.

"On-The-Go Supplement to the USB 2.0 Specification Revision 1.0", Dec. 18, 2001; cover page, pp. 1, 37-41, and 47-49.

Linke, Bernhard, "Choosing the Right 1-Wire Master for Embedded Applications", *MAXIM*, Application Note 4206, May 27, 2008, pp. 1-10 www.maxim-ic.com/an4206.

Linke, Bernhard, "Overview of 1-Wire Technology and Its Use", *MAXIM*, Application Note 1796, Jun. 19, 2008, pp. 1-11 www.maxim-ic.com/an1796.

O'Donnell, B., "White Paper HDMI™: The Digital Display Link", *IDC Analyze the Future*, Framingham, MA, Dec. 2006, pp. 1-21.

Hitachi, Ltd., et al., "High-Definition Multimedia Interface: Specification Version 1.3", *HDMI Licensing, LLC*, Jun. 22, 2006, pp. 1-237.

International Bureau, International Preliminary Report on Patentability for International Application No. PCT/US2008/085287 mailed Jul. 15, 2010.

USPTO, Notice of Allowance for U.S. Appl. No. 11/969,852 mailed Aug. 13, 2010.

Notice of Allowance for U.S. Appl. No. 11/969,865 mailed Nov. 29, 2010.

Examination Report for European Patent Application No. 08870128.9 mailed Apr. 29, 2011.

* cited by examiner

METHOD, APPARATUS AND SYSTEM FOR GENERATING AND FACILITATING MOBILE HIGH-DEFINITION MULTIMEDIA INTERFACE

FIELD

Embodiments of the invention generally relate to the field of networks and, more particularly, to a method, apparatus and system for generating and facilitating Mobile High-Definition Multimedia Interface (HDMI-M).

BACKGROUND

High-Definition Multimedia Interface (HDMI) refers to an industry-supported digital connection standard interface designed to provide the highest level of uncompressed video and audio quality over a thin, easy-to-use cable with a simple, consumer-friendly connector. HDMI facilitates the highest level of video and audio quality, while employing a single thin cable, for an entertainment experience that is unmatched. For example, HDMI can carry video signals of resolutions up to and/or beyond 1080p in full-color at full 60 Hz and higher refresh rates. HDMI employs a single cable to serve as an interface between any number of audio/video sources, such as a set-top box, a Digital Video Disk or Digital Versatile Disk (DVD) player, an audio/video (A/V) receiver, an A/V monitor (e.g., digital television (DTV)).

Although HDMI is an industry standard and was created with forward-looking specification, the fast and continues growth of technology and technology-related devices makes it apparent that HDMI and/or any media devices, cables, and other elements in a network using HDMI would have to be updated, enhanced, and/or enabled such that the compatibility of the various components of the network is preserved for data transmission, while users can continue to receive and enjoy the benefits of HDMI.

For example, FIG. 1A illustrates a conventional HDMI communication network 100. Network 100 includes three devices that include a cellular telephone 102, a computer or server 104 (e.g., personal computer (PC)), and a high-definition television (HDTV) 106 in communication with each other. As illustrated, an HDMI-based communication 108 is setup between the computer 104 and the HDTV 106, but a conventional Universal Serial Bus (USB)-based communication 110 is established between the cell phone 102 and the computer 104. Today's cell phones 102 are used not only for verbal communication, but also for uploading, downloading, watching a variety of premium media, such as photos, movies, etc. However, using conventional techniques, as illustrated in FIG. 1A, to view premium media contents (e.g., pictures, movies) on the HDTV 106, first a download of such contents to the computer 104 is needed to be performed via the USB link 110 and then the computer 104 is used to send the contents to the high-definition television (HDTV) 106 via the HDMI link 108. Stated differently, today's conventional techniques do not allow for many of the important media devices (e.g., cell phone 102) to engage in a direct HDMI-based communication with other HD-compatible devices (e.g., HDTV 106).

FIG. 1B illustrates a conventional HDMI path 150. Transmitter side 174 is composed of HDMI logic 152, an encoder 154, and a serializer, while receiver side 178 is composed of a deserializer, a decoder 156, and HDMI logic 172. In this conventional HDMI path 150, HDMI logic 152 generates HDMI packets for each channel 160, 162, 164 that is encoded by the encoder 154 and then transmitted using a serializer. Encoding is performed separately by the encoder 154 for each of the channel 160, 162, 164. The encoder 154 keep running disparity and distance property for a proper data transfer thru the serial differential channels 160, 162, 164. An HDMI receiver 178 receives the serial data, de-serializes it, and decodes using a decoder 156. The decoder 156 generates audio data, video data, synchronization (SYNC) signals (e.g., Horizontal Synchronization (HSYNC), Vertical Synchronization (VSYNC), CTLS), and DE signal for HDMI logic 172. This decoding is performed separately for each channel 160, 164, 166 since the decoder 156 needs to keep the last value of SYNC signals when audio/video data arrives. For example, HSYNC refers to a signal given to a monitor telling it to stop drawing the current horizontal line, and start drawing the next line. The amount of time this takes to occur is measured in Hertz (Hz), which refers to cycles per second. VSYNC refers to a signal used to describe a process or a set of values telling the monitor when to draw the next frame. The time it takes for this to occur is also measured in Hertz.

SUMMARY

A method, apparatus and system are provided for generating and facilitating Mobile High-Definition Multimedia Interface.

In one embodiment, an apparatus include a transmitter configured to merge multiple channels of a high-definition interface into a single channel to generate a mobile high-definition interface, the mobile high-definition interface configured to facilitate carrying of high-definition media content in a mobile device. The apparatus further includes a receiver coupled with the transmitter, the receiver configured to receive the single channel, and to unmerge the single channel into the multiple channels.

In one embodiment, a system includes a transmitter configured to receive a high-definition interface package having multiple channels of a high-definition interface, the transmitter including a multiplexer configured to multiplex the multiple channels into a single channel to generate a mobile high-definition interface, the mobile high-definition interface configured to facilitate carrying of high-definition media content in a mobile device. The system further includes a receiver coupled with the transmitter, the receiver configured to receive the single channel, the receiver including a de-multiplexer configured to de-multiplex the single channel into the multiple channels.

In one embodiment, a network includes a first network device having a first network interface configured to host a high-definition interface, the high-definition interface having multiple data channels, the multiple data channels having three data channels configured to carry audio data, video data, and auxiliary data over all three channels together or separately. The network further includes a second network device having a second network interface configured to host a mobile high-definition interface, wherein the mobile high-definition interface including a single data channel having the multiple data channels, the single data channel configured to carry the audio data, the video data, and the auxiliary data.

In one embodiment, a method includes merging multiple channels of a high-definition interface into a single channel to generate a mobile high-definition interface, the mobile high-definition interface configured to facilitate carrying of high-definition media content in a mobile device. The method further includes receiving the single channel, and unmerging the single channel into the multiple channels.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Embodiments of the invention are generally directed to generating and facilitating Mobile High-Definition Multimedia Interface.

As used herein, "entertainment network" or "communication network" mean an interconnection network to deliver digital media content (including music, audio/video, gaming, photos, and others) between devices. An entertainment network may include a personal entertainment network, such as a network in a household, an entertainment network in a business setting, or any other network of entertainment devices. In such a network, certain network devices may be the source of media content, such as a digital television tuner, cable set-top box, video storage server, and other source device. Other devices may display or use media content, such as a digital television, home theater system, audio system, gaming system, and other devices. Further, certain devices may be intended to store or transfer media content, such as video and audio storage servers. Certain devices may perform multiple media functions. In some embodiments, the network devices may be co-located on a single local area network. In other embodiments, the network devices may span multiple network segments, such as through tunneling between local area networks. The entertainment network may include multiple data encoding and encryption processes.

Figure 1A:
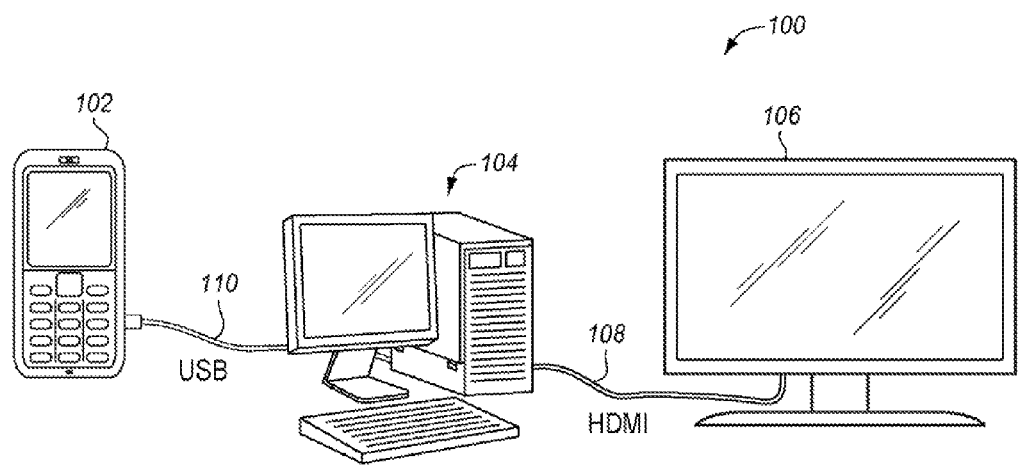
FIG. 1A illustrates a conventional HDMI network.
Figure 1B:
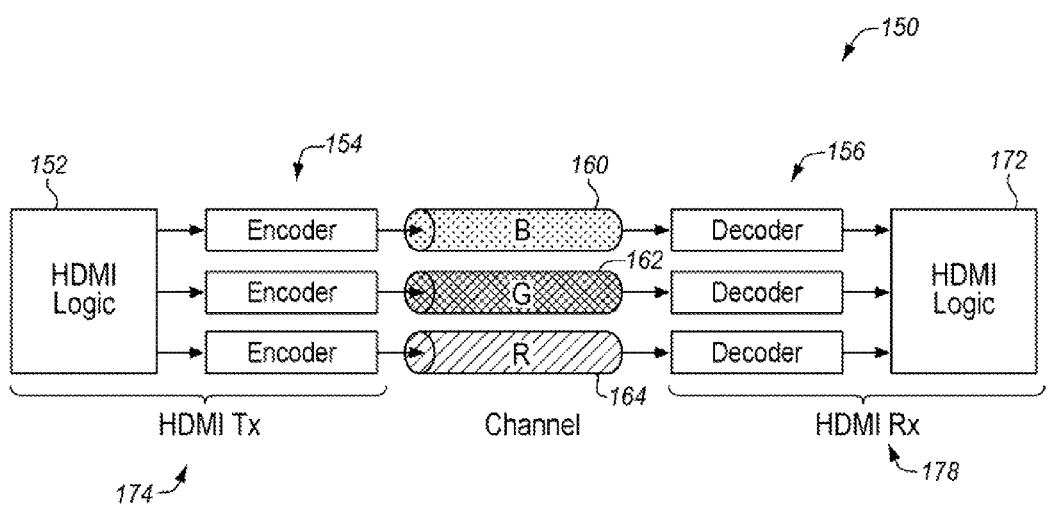
FIG. 1B illustrates a conventional HDMI path.
Figure 2:
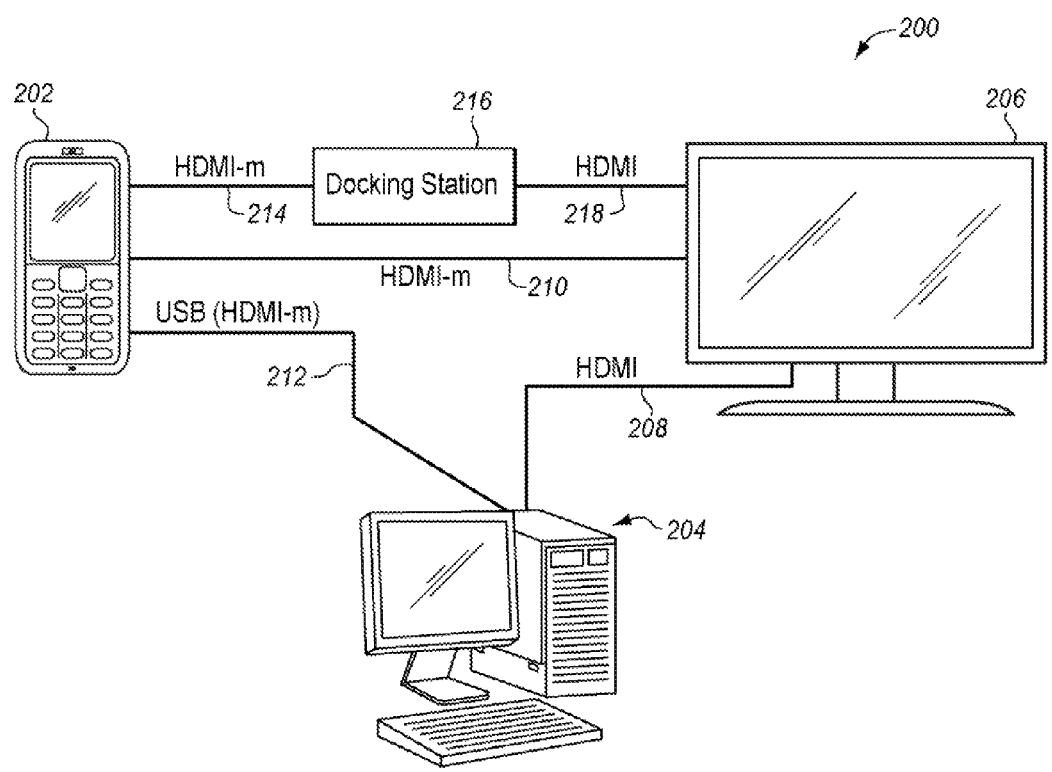
FIG. 2 illustrates an embodiment of a communication network employing an embodiment of HDMI-M.

FIG. 2 illustrates an embodiment of a communication network 200 employing an embodiment of HDMI-M. The illustrated network 200 includes various media devices, such as a mobile phone 202, a computer or server 204 (e.g., PC) and a television 206 (e.g., HDTV). There may be any number of devices in the network 200. In this network 200, the devices 202-206 may transfer data stream, such as streaming media data, to each other and to other devices in the network 200. In one embodiment, HDMI-M communication 212 is performed using a USB-compatible HDMI-M cable 212 is used to communicate (e.g., download, upload) contents (e.g., pictures, movies) between the mobile phone 202 and the computer 204. In another embodiment, a docking station 216 is employed between the cell phone 202 and the television 206. For example, the illustrated docking station 216 is shown in communication with the cell phone 202 via HDMI-M 214, while the docking station 216 is in communication with the television 206 via HDMI 218 because the illustrated exemplary television 206 is a conventional television that does not support HDMI-M. In one embodiment, the docking station 216 is used to change HDMI-m 214 into HDMI 218 to support the television that does not support HDMI-m. In yet anther embodiment, the television 206 is made HDMI-M-compatible, which eliminates the need for the separate docking station 216, and a direct HDMI-M communication 210 is established between the mobile phone 202 and the television 206. Furthermore, HDMI communication 208 is established between the television 206 and the computer 204.

Figure 3:
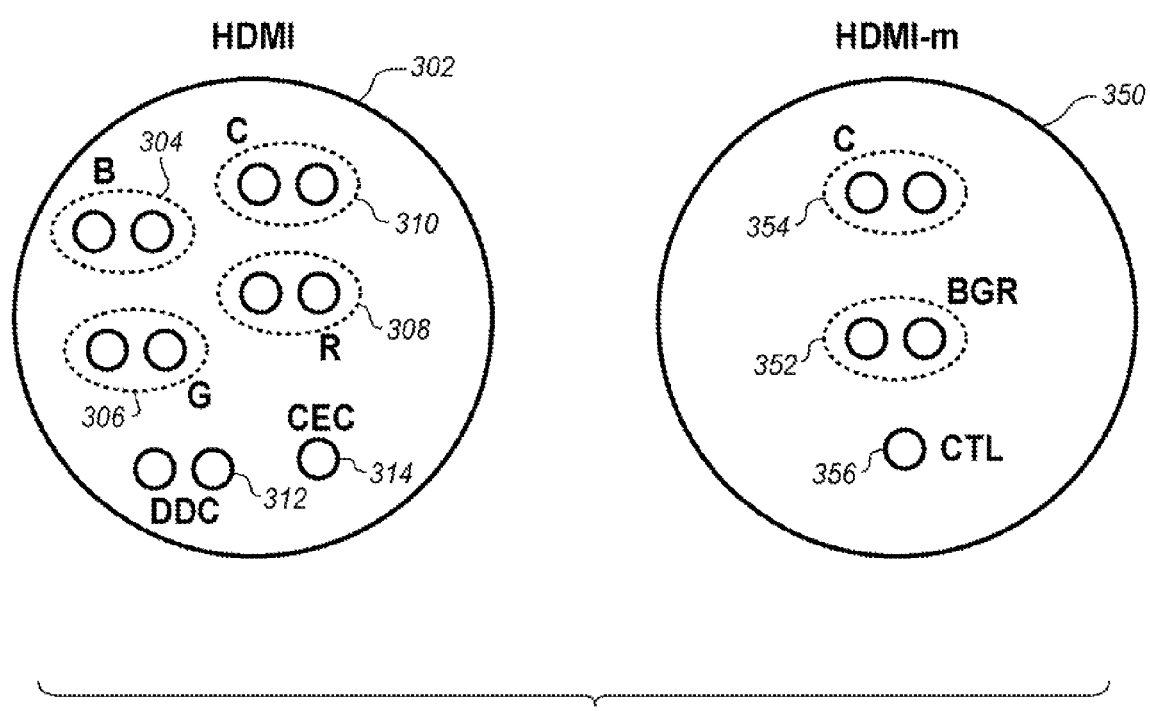
FIG. 3 illustrates an embodiment of an HDMI-M cable to facilitate HDMI-M.

FIG. 3 illustrates an embodiment of an HDMI-M cable 350 to facilitate HDMI-M. With small devices, particularly mobile devices (e.g., mobile phone 202 of FIG. 2), it is not feasible to use a regular HDMI cable since small devices have small connectors which cannot accept relatively large HDMI cables. As illustrated, a conventional HDMI cable 302 includes a number of wires or channels, such as blue (B) (two wires) 304, green (G) (two wires) 306, red (R) (two wires) 308, C (two wires) 310, display data channel (DDC) (two wires) 312, and consumer electronics control (CEC) (one wire) 314. It is contemplated that these wires, such as B 304, G 306, and R 308, represent various channels and are employed for performing specific tasks. For example, blue wires 304 carry HSYNC and VSYNC, and green wires 306 and red wires 308 carry audio data, while all three channels 304, 306, 308 carry video data and some control packets altogether. Hence, it is contemplated that each of these elements or wires relating to these elements was dedicated to serving various purposes. A small mobile device, such as a cell phone, is not equipped to accept a cable as big as the HDMI cable 302 due to the device's small size and consequently having a small connector. In one embodiment, an HDMI-M cable 350 is generated such that it can be used with small mobile devices so they can be made HD-compatible and users can enjoy the benefits of HD.

In one embodiment, the HDMI-M cable 350 is generated by transforming the HDMI cable 302 by reducing the number of wires of the HDMI cable 302. For example, three pairs of wires of B 304, G 306, and R 308 are collectively reduced into a single pair wires for BGR 352. Furthermore, in one embodiment, the two DDC wires 312 and the one CEC wire 314 are collectively reduced to single control bus CTL 356. This reduction of wires from a total of eleven wires 304-314 of the conventional HDMI cable 302 to a total of 5 wires 352-356 of the new and novel HDMI-M cable 350 is performed using one or more embodiments of multiplexing as illustrated and described in various subsequent figures of this document. In some embodiment, additional features may be added to the HDMI-M cable 350. Such additional features may include a pair of USB wires and power (such as from a receiver (Rx) to a transmitter (Tx)) to charge a mobile phone while media content is being watched.

In one embodiment, HDMI-M is provided for transmitting digital audio-visual signals (e.g., digital television audio-visual signals) from mobile devices, such as mobile video players, video cameras, and other audio-visual sources to other devices, such as television sets, projectors, and other video displays. HDMI-M interface may be provided via an HDMI-M cable 350 that includes a reduced pin-count version of the standard HDMI cable. HDMI-M carries high quality multi-channel audio data, while carrying standard and high-definition consumer electronics video formats. Content protection technology is also provided. HDMI-M carries audio and/or video data in a single direction, control and status information in both directions through a single control wire, while having the ability to carry USB data concurrently with HDMI data, using a dedicated differential pair. Throughout this document, a description of HDMI-M serving as a complete transmission and interconnect solution is provided. Furthermore, the underlying Transition Minimized Differential Signaling (TMDS)-based protocol and associated electrical signaling are also described with reference to HDMI-M. Any connector and the signal placement within the connector are also described. Mechanical, electrical, behavioral, and protocol requirements necessary for compliance with HDMI-M are provided for sources, sinks and cables. A source refers to a device with an HDMI or HDMI-M output. A sink refers to a device with an HDMI or HDMI-M input. An HDMI or HDMI-M repeater is a device that can simultaneously behave as both a sink and a source. A receiver refers to a component that is responsible for receiving TMDS input as an input to a sink and converting those signals into a digital output indicating, for example, a 24 bit, a 12 bit, or a 6 bit TMDS decoded word and indicating the TMDS coding mode used to decode those bits. This digital output may be contained within a semiconductor device or may be output from a semiconductor device. A transmitter refers to a component that is responsible for driving the TMDS output pairs into an HDMI output or HDMI-M output and for clocking the data driven into those four output pairs.

Figure 4:
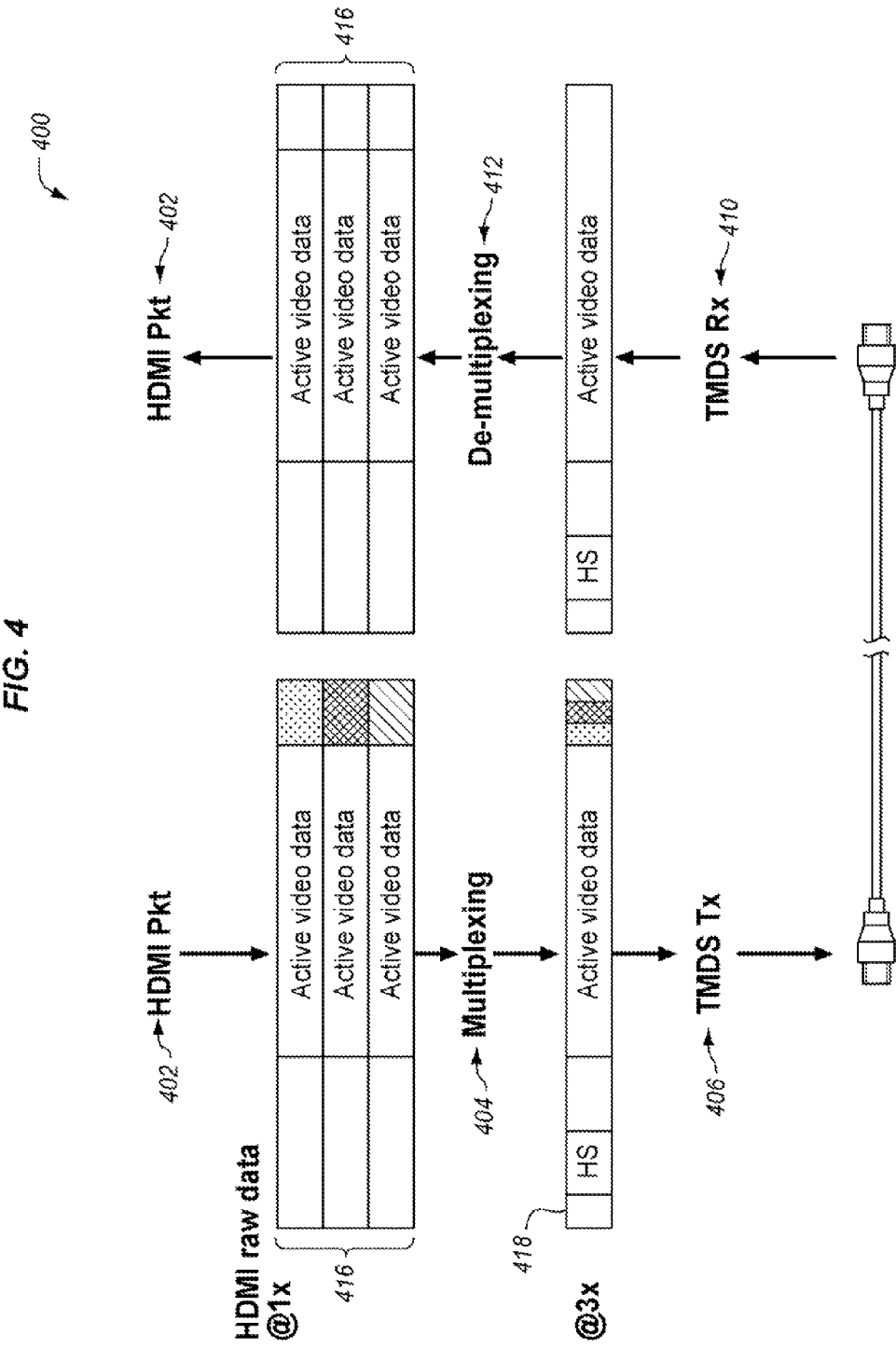
FIG. 4 illustrates an embodiment of multiplexing to facilitate HDMI-M.

FIG. 4 illustrates an embodiment of multiplexing 400 to facilitate HDMI-M. In one embodiment, the multiplexing 400 includes a TMDS time multiplexing to merge the three different pairs (e.g., B, G, R) of HMDI into a single differential pair to facilitate HDMI-M. As illustrated, an HDMI packet 402 is received including three channels 416 of the HDMI packet 402 (e.g., three channels of HDMI at 1× clock). The HDMI three channels 414 are multiplexed into a single channel 418 (e.g., at 3× clock). A transmitter 406 sends out this packed packet via some cables 408 onto a receiver 410. The receiver 410 receives the packed packet and de-multiplexes 412 the input stream of the single cannel 418 back into the three channels 416 of the HDMI packet 402.

Figure 5:
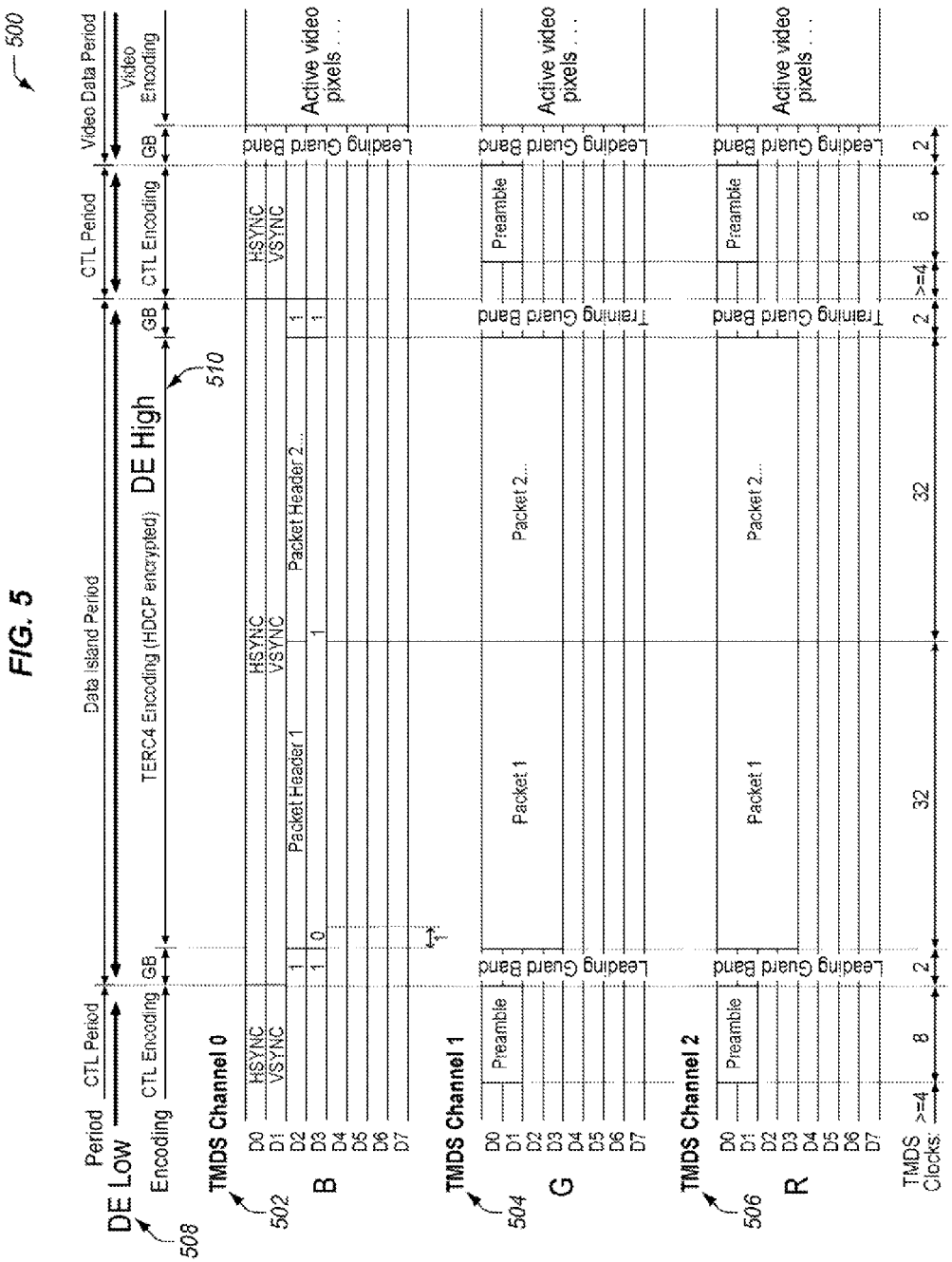
FIG. 5 illustrates an embodiment of HDMI signaling to facilitate HDMI-M.

FIG. 5 illustrates an embodiment of HDMI signaling 500 to facilitate HDMI-M. Three HDMI channels TMDS channel 0 502, TMDS channel 1 504, and TMDS channel 2 506 are illustrated. Channel 0 502 represents blue, channel 1 represents green, and channel 2 represents red. In one embodiment, during the transferring of audio and/or video, DE signal becomes high 510, while during HSYNC and VSYNC periods, DE signal becomes low 508. This DE signal is used as a multiplexing and de-multiplexing reference signal. This is described further with reference to subsequent figures.

Figure 6:
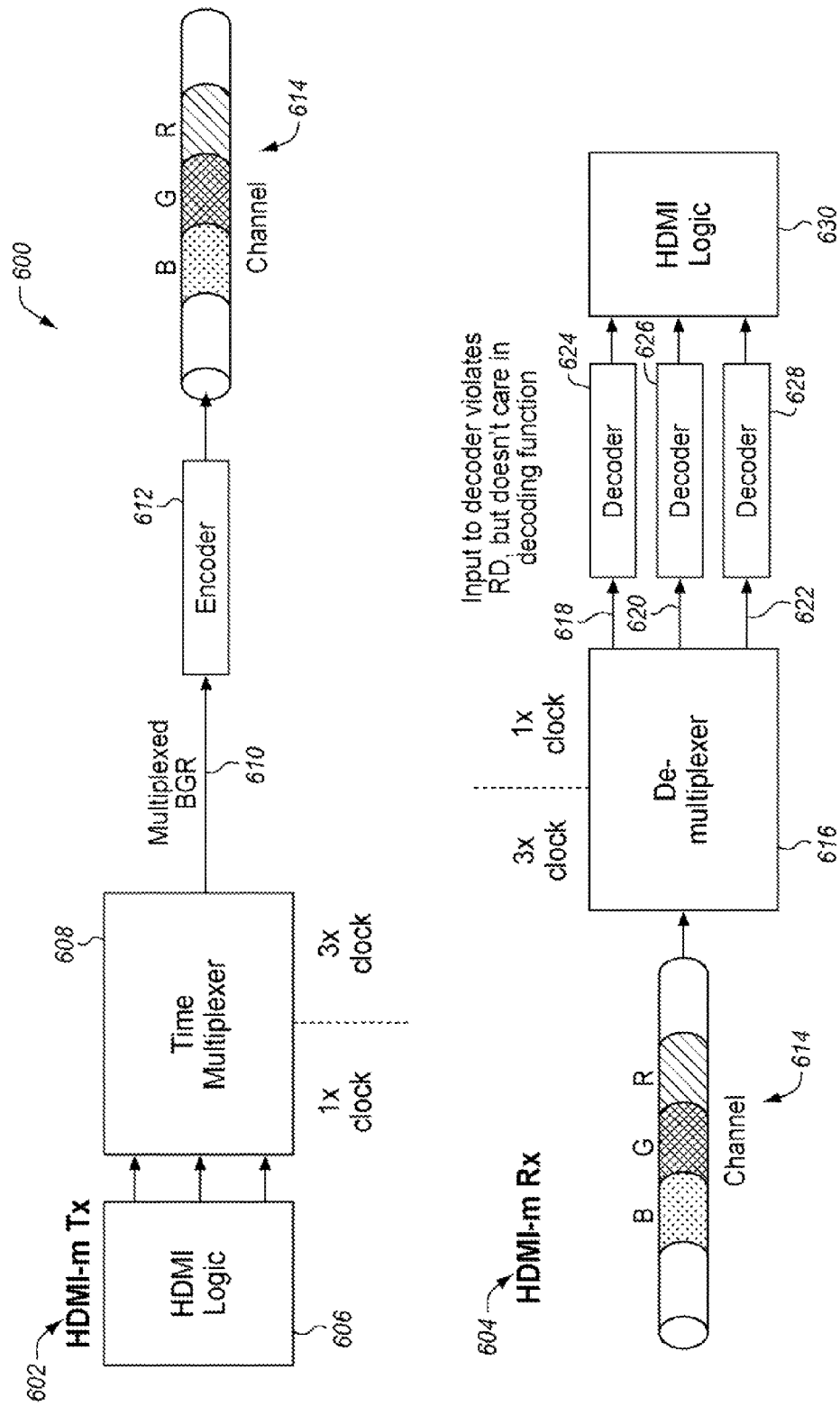
FIG. 6 illustrates an embodiment of a multiplexing/de-multiplexing path to facilitate HDMI-M.

FIG. 6 illustrates an embodiment of a multiplexing/de-multiplexing path 600 to facilitate HDMI-M. At HDMI-M transmitter 602, a three-channel HDMI packet produced by HDMI logic 606. This three-channel HDMI packet is first time multiplexed in the order of, for example, B, G, and R 610, using a time multiplexer 608. It is contemplated that this order can be different as long as the transmitter 602 and the receiver 604 use the same order. Since DE is high for R/G/B data, the first DE high is aligned to the first one of R/G/B and since, in the illustrated embodiment, B is the first data sent over the channel, the first DE high is aligned to the B. This multiplexed BGR 610 then proceed so a TMDS encoder 612 resulting in a single BGR channel 614. This order of first multiplexing and then encoding is maintained to keep the running disparity and run length of a single channel. For example, if encoding using three encoders is done prior to multiplexing, the channel might not be able to keep those properties since each encoder would not know about the data in the other two encoders.

At HDMI-M receiver 604, the multiplexed BGR channel 614 is first de-multiplexed using a de-multiplexer 616 into three separate streams of B 618, G 620, and R 622. In this embodiment of de-multiplexing, the first DE high is aligned to B data as B 618 is the first of the three and this is to help determine which data is associated with the B and which data is associated with the R, and so forth. Once the de-multiplexing is done, decoding for each channel 618, 620, 622 is separately performed using decoders 624, 626, 628 to be used by HDMI logic 630. In one embodiment, this novel order of decoding after de-multiplexing is used for each decoder 624, 626, 628 to keep the last SYNC values during DE high period. This SYNC keeping has to be done for each channel 618, 620, 622 separately since each channel carries different SYNC signals. In one embodiment, this order of de-multiplexing before decoding is used since a TMDS decoder 624, 626, 628 does not use certain properties, such as running disparity in decoding function itself. Also, the de-multiplexing losing the running disparity property does not have any impact on the TMDS decoders 624, 626, 628 used here (since they do not use such properties) makes the order of de-multiplexing before decoding feasible and practical. Furthermore, by using this novel scheme of decoding after de-multiplexing, the HDMI-M receiver 604 can be used as a dual mode receiver for HDMI and HDMI-M since this decoding after de-multiplexing scheme would appear to be the same to the HDMI logic 630 as the HDMI logic 630 is tricked into failing to see the difference between this novel scheme and the conventional multiplexing/de-multiplexing.

Figure 7:
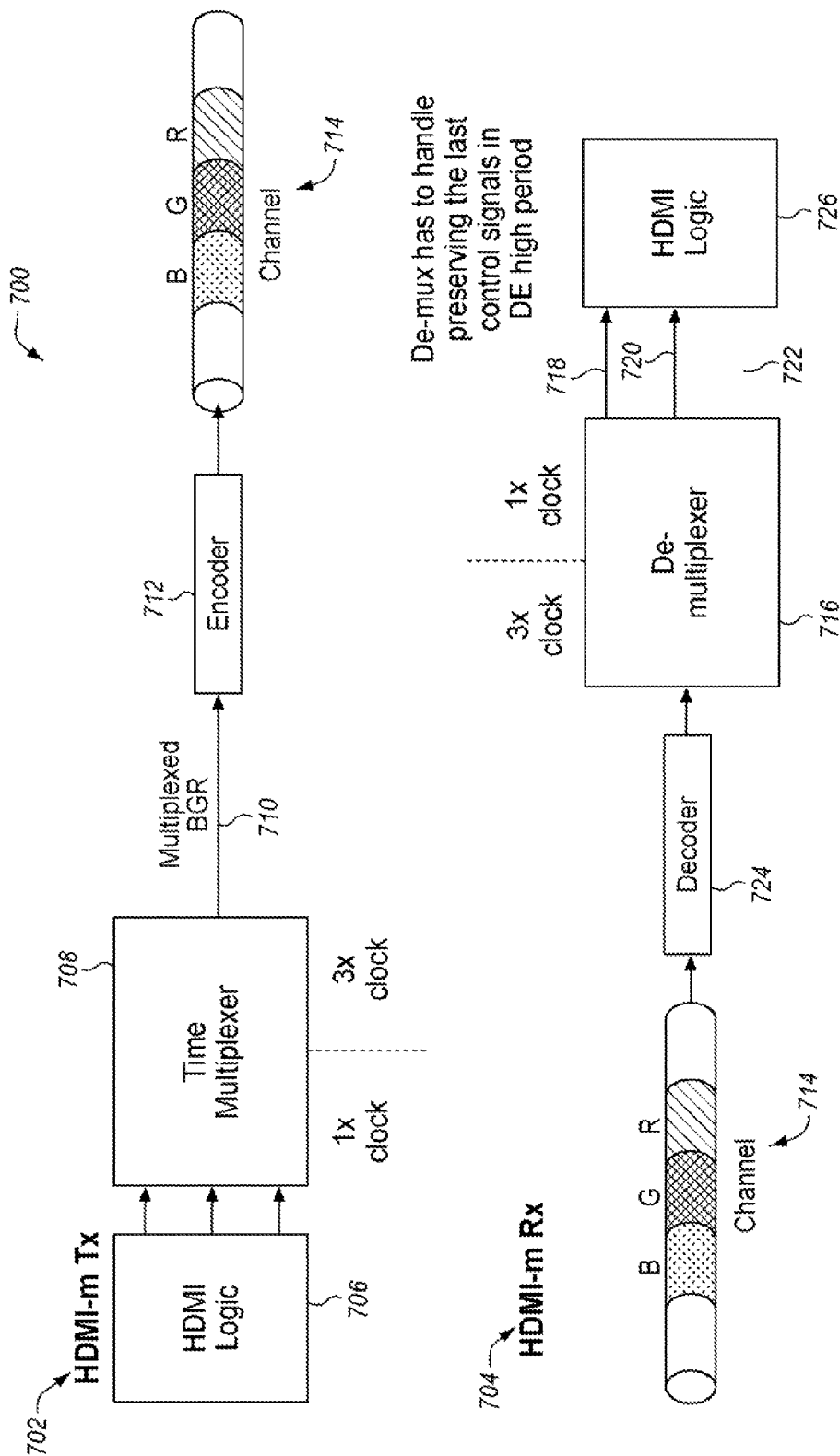
FIG. 7 illustrates an embodiment of a multiplexing/de-multiplexing path to facilitate HDMI-M.

FIG. 7 illustrates an embodiment of a multiplexing/de-multiplexing path 700 to facilitate HDMI-M. For brevity, sections of this multiplexing/de-multiplexing path 700 that are similar to the path 600 of FIG. 6 are not described here in FIG. 7. For example, in the illustrated embodiment, the multiplexing process at HDMI-M transmitter 702 is the same at the multiplexing process at HDMI-M transmitter 602. At HDMI-M receiver 704, the order of de-multiplexing and decoding is swapped relative to the order described in FIG. 6. Using this novel scheme of performing decoding using a decoder 724 before performing de-multiplexing using a de-multiplexing 716, the decoder 724 does not keep the last SYNC values of each channel B 718, G 720, R 722. In this embodiment, this particular function is performed by the de-multiplexer 716, which keeps the last SYNC values for each channel B 718, G 720, and R 722, which means the de-multiplexer 716 handles the preserving the last control signals in DE high period.

Figure 8:
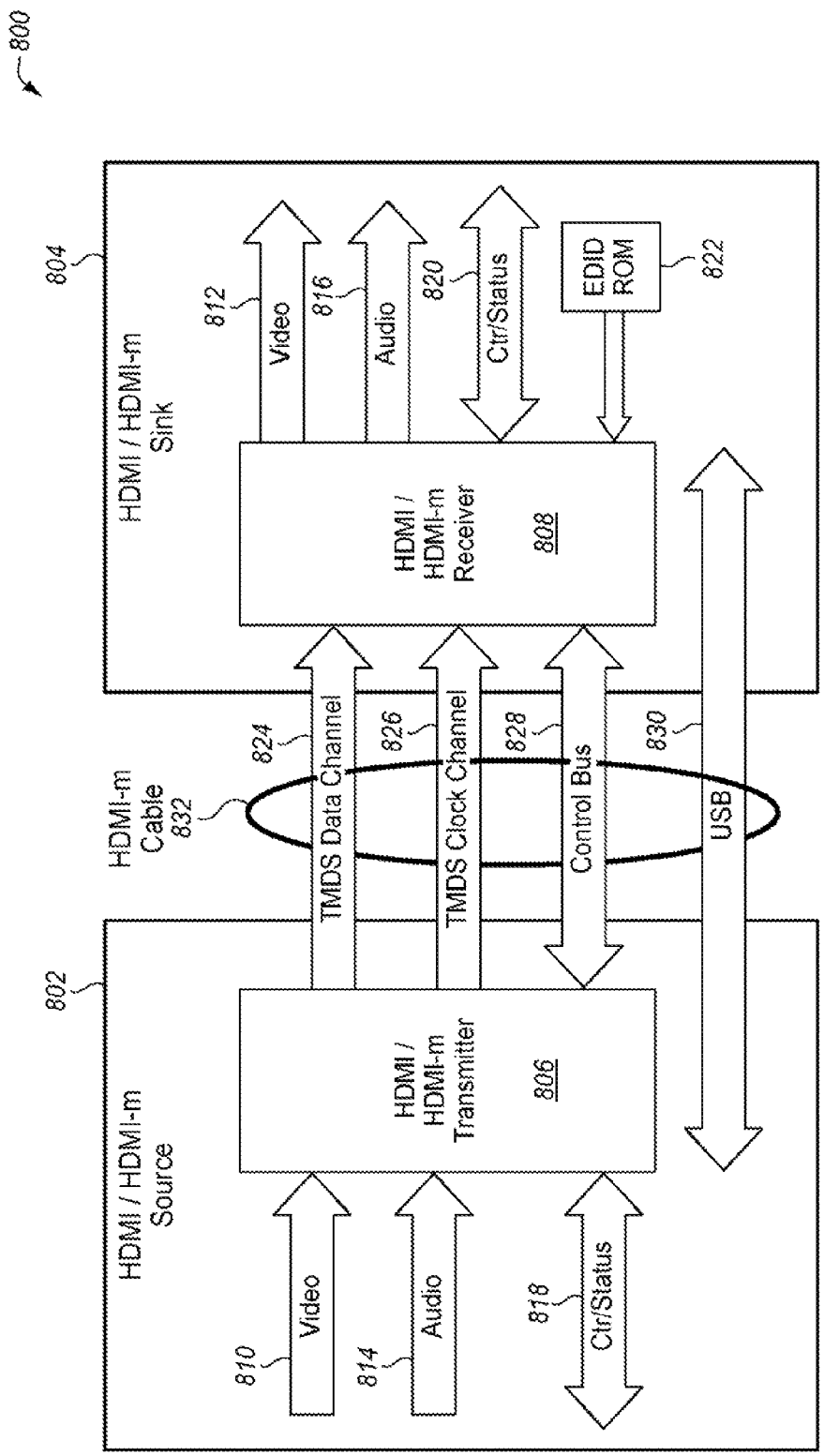
FIG. 8 illustrates an embodiment of an HDMI-M system architecture having an HDMI-M cable.

FIG. 8 illustrates an embodiment of an HDMI-M system architecture 800 having an HDMI-M cable 832. In the illustrated embodiment, the illustrated embodiment of the HDMI-M system architecture 800 includes a source 802 and a sink 804. A given device may have one or more HDMI-M inputs and one or more HDMI-M outputs. Each HDMI-M input on these devices follows the rules for an HDMI-M Sink and each HDMI-M output follows the rules for an HDMI-M Source. As illustrated, the HDMI-M cable 832 and connectors carry two differential pairs that make up a TMDS data channel 824 and a TMDS clock channel 826. These channels 824, 826 are used to carry video 810, 812, audio 814, 816, and auxiliary data 818, 820. Furthermore, the HDMI-M cable 832 carries a single wire control bus 828. The control bus 828 is used for configuration and status exchange between a single source 802 and a single sink 804 and provides high-level control functions between all of the various audiovisual products in a user's environment. In one embodiment, the control bus 828 replaces both the conventional DDC and the CEC buses of a standard HDMI connection and is extensible to carry other protocols as well. Furthermore, in one embodiment, the HDMI-M cable has the ability to carry USB data concurrently with HDMI data using a dedicated USB connection differential pair 830. Using the USB source, when the HDMI-M source 802 would behave as a USB device, the HDMI-M sink 804 behaves as a USB host.

In one embodiment, the three conventional channels of a standard HDMI interface are multiplexed onto the single data channel 824. Video 810, 812, audio 814, 816, and auxiliary data 818, 820 are all transmitted via this single TMDS data channel 824. A TMDS clock, typically running at the times the video pixel rate, is transmitted via the TMDS clock channel 826 and is used by the 808 receiver as a frequency reference for data recovery on the TMDS data channel 824. At the source 802, TMDS encoding converts 8 bits of HDMI data for each channel into 10 bits transition-minimized code (TMDS) sequence which is then transmitted serially across the TMDS data channel 824 at a rate of 10 bits per TMDS clock period. The link frequency of up to 225 MHz allows for pixel clock rates of up to 75 MHz (e.g. 720p/1080i). Video data can have a pixel size of 24, 30, 36, and 48 bits, etc., and the video at the default 24-bit color depth is carried at a TMDS clock rate equal to the pixel clock rate. Higher color depths are carried using a correspondingly higher TMDS clock rate. Video formats with TMDS rates below 25 MHz (e.g., 13.5 MHz for 480i/NTSC) can be transmitted using a pixel-repetition scheme. The video pixels can be encoded in various formats including RGB, YCBCR 4:4:4, YCBCR 4:2:2, etc. It is contemplated that these numbers (e.g., frequency numbers) are used here merely as examples and that these numbers can change as desired or necessitated.

To transmit audio and auxiliary data across the TMDS data channel 824, HDMI-M uses the same packet structure as the standard HDMI. For example, the basic audio functionality consists of a single IEC 60958 L-PCM audio stream at sample rates of 32 kHz, 44.1 kHz, and 48 kHz, etc. This, for example, can accommodate any normal stereo stream. Optionally, HDMI-M can carry such audio at sample rates of up to 192 KHz and with 3 to 8 audio channels. HDMI-M can also carry an IEC 61937 compressed (e.g., surround-sound) audio streams at bit rates up to 24.576 Mbps. HDMI-M can also carry from 2 to 8 channels of one bit audio and a compressed form of one bit audio called direct stream transport (DST). The control bus 828 is used as a point-to-point single-wire bus that is intended to provide a bridge for both the DDC and the CEC protocols of the conventional HDMI and provide enough headroom to be used for other protocols in the future. Additionally, in one embodiment, HDMI-M provides a dedicated differential USB pair 830 to carry USB data concurrently with HDMI data as part of the HDMI-M cable 832. The HDMI-M source 802 behaves as a USB device, while the HDMI-M sink 804 behaves as a USB host when USB data is carried via the USB connection 830. The decision of who is USB host and who is USB device may be done using a USB specification, such as USB OTG. It is contemplated that these numbers (e.g., frequency numbers) are used here merely as examples and that these numbers can change as desired or necessitated. Furthermore, it is contemplated that various connections and connection arrangements may be amended within or around the HDMI-M cable 832 to properly and efficiently facilitate HDMI-M and keep up with the changing technology and as desired or necessitated.

Figure 9:
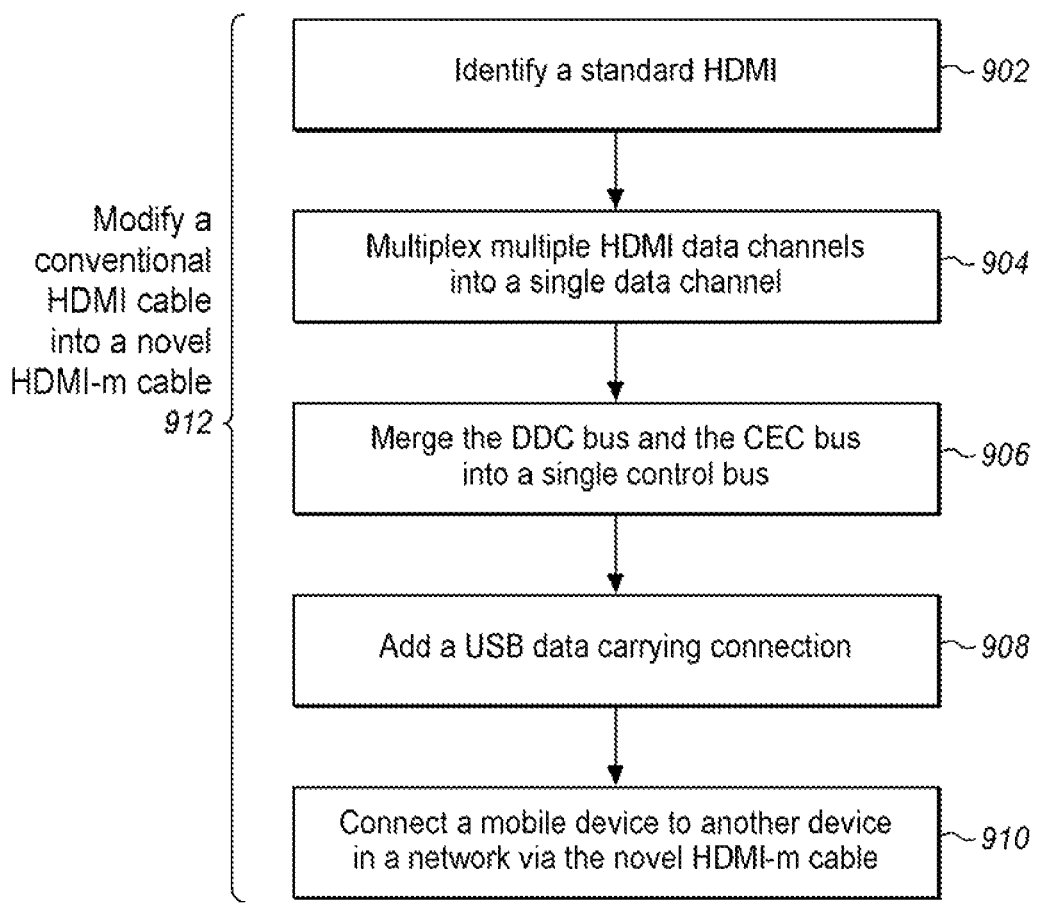
FIG. 9 illustrates an embodiment of a process to generate and facilitate HDMI-M.

FIG. 9 illustrates an embodiment of a process to generate and facilitate HDMI-M. In one embodiment, an HDMI is identified at processing block 902. The HDMI is typically facilitated between devices via an HDMI cable having standard HDMI wires, connectors, and/or carriers. To facilitate HDMI-M between devices, including small mobile devices (e.g., cell phones, handheld devices, i-pods, etc.) that typically cannot accept a standard HDMI, the standard HDMI cable is modified into a novel HDMI-M cable 912. In one embodiment, multiple HDMI data channels (e.g., three HDMI channels for audio data, video data, auxiliary data, etc.) are multiplexed into a single data channel at processing block 904. The process and architecture for multiplexing, de-multiplexing, encoding, and decoding are described elsewhere in this document, such as in some of the preceding figures.

In one embodiment, as with the data channels, the multiple buses of the standard HDMI cable, such as the DDC bus and the CEC bus, are modified into a single control bus to facilitate HDMI-M at processing block 906. Furthermore, at processing block 908, additional features, such as a USB connection pair, are added to the novel HDMI-M cable to facilitate transfer of other forms of data, such as transfer of any USB data between devices. At processing block, a connection between an HDMI-m device and a HDMI device (non-HDMI-m device) is established using the novel HDMI-M technology and cable. For example, using HDMI-M, a handheld device with HDMI-m can be connected to communicate with a high-definition television supporting HDMI (but not HDMI-m). Such connection is established via a docking station (if, for example, the television is not HDMI-M equipped or compatible) between the devices, or the connection is established without the docking stations (if, for example, the television is made HDMI-M equipped or compatible).

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. There may be intermediate structure between illustrated components. The components described or illustrated herein may have additional inputs or outputs which are not illustrated or described.

Various embodiments of the present invention may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments of the present invention may be provided as a computer program product, which may include a computer-readable medium having stored thereon computer program instructions, which may be used to program a computer (or other electronic devices) to perform a process according to the embodiments of the present invention. The machine-readable medium may include, but is not limited to, floppy diskettes, optical disks, compact disk read-only memory (CD-ROM), and magneto-optical disks, read-only memory (ROM), random access memory (RAM), erasable programmable read-only memory (EPROM), electrically-erasable programmable read-only memory (EEPROM), magnet or optical cards, flash memory, or other type of media/machine-readable medium suitable for storing electronic instructions. Moreover, the present invention may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the embodiments of the present invention is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example of the present invention. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments of the present invention, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims are hereby expressly incorporated into this description, with each claim standing on its own as a separate embodiment of this invention.

What is claimed is:

1. An apparatus comprising:
   a transmitter configured to merge multiple channels of a high-definition interface into a single channel to generate a mobile high-definition interface, the mobile high-definition interface configured to facilitate carrying of high-definition media content in a mobile device; and
   a receiver coupled with the transmitter, the receiver configured to receive the single channel, and to unmerge the single channel into the multiple channels, wherein the receiver includes a decoder configured to perform separate decoding of each of the multiple channels, if the de-multiplexing of the single channel is performed prior to the decoding of the multiple channels.

2. The apparatus of claim 1, wherein the mobile high-definition interface includes a single control bus representing a Display Data Channel (DDC) bus and a Consumer Electronics Control (CEC) bus.

3. The apparatus of claim 2, wherein the mobile high-definition interface further includes a Universal Serial Bus (USB) channel capable of carrying USB data.

4. The apparatus of claim 1, wherein the multiple channels are configured to carry audio data, video data, and/or auxiliary data either together or separately, wherein the video data is carried by each of the channels, Horizontal Synchronization (HSYNC) and/or Vertical Synchronization (VSYNC) data is carried by one of the channels, the audio data is carried by multiple channels of the channels, and control packets are carried by multiple channels of the channels over.

5. The apparatus of claim 1, wherein the single channel is configured to carry the audio data, the video data, and the auxiliary data.

6. The apparatus of claim 1, wherein the merging of the multiple channels into the single channel includes multiplexing the multiple channels into the single channel via a multiplexer at the transmitter.

7. The apparatus of claim 1, wherein the unmerging of the single channel into the multiple channels includes de-multiplexing the single channel into the multiple channels via a de-multiplexer at the receiver.

8. The apparatus of claim 1, wherein the decoder configured to perform decoding of the single channel, if the de-multiplexing of the single channels is performed after the decoding of the single channel.

9. A system comprising:
   a transmitter configured to receive a high-definition interface package having multiple channels of a high-definition interface, the transmitter including a multiplexer configured to multiplex the multiple channels into a single channel to generate a mobile high-definition interface, the mobile high-definition interface configured to facilitate carrying of high-definition media content in a mobile device; and
   a receiver coupled with the transmitter, the receiver configured to receive the single channel, the receiver including a de-multiplexer configured to de-multiplex the single channel into the multiple channels, wherein the receiver includes a decoder configured to perform separate decoding of each of the multiple channels, if the de-multiplexing of the single channel is performed prior to the decoding of the multiple channels.

10. The system of claim 9, wherein the decoder configured to perform decoding of the single channel, if the de-multiplexing of the single channels is performed after the decoding of the single channel.

11. The system of claim 9, wherein the mobile high-definition interface includes a single control bus representing a Display Data Channel (DDC) bus and a Consumer Electronics Control (CEC) bus.

12. The system of claim 9, wherein the multiple channels are configured to carry audio data, video data, and/or auxiliary data either together or separately, wherein the video data is carried by each of the channels, Horizontal Synchronization (HSYNC) and/or Vertical Synchronization (VSYNC) data is carried by one of the channels, the audio data is carried by multiple channels of the channels, and control packets are carried by multiple channels of the channels.

13. A network comprising:
   a first network device having a first network interface configured to host a high-definition interface, the high-definition interface having multiple data channels, the multiple data channels having configured to carry audio data, video data, and/or auxiliary data; and
   a second network device having a second network interface configured to host a mobile high-definition interface, wherein the mobile high-definition interface including a single data channel having the multiple data channels, the single data channel configured to carry the audio data, the video data, and the auxiliary data, wherein the single data channel is received by a receiver, the receiver including a de-multiplexer configured to de-multiplex the single data channel into the multiple data channels, wherein the receiver includes a decoder configured to perform separate decoding of each of the multiple channels, if the de-multiplexing of the single data channel is performed prior to the decoding of the multiple data channels.

14. The network of claim 13, wherein the decoder is configured to perform decoding of the single channel, if the de-multiplexing of the single channels is performed after the decoding of the single channel.

15. The network of claim 13, wherein the second network device comprises a mobile device including one or more of a mobile telephone, a handheld computer device, and a mobile audio/video device.

16. The network of claim 13, wherein the multiple data channels are multiplexed into the single data channel via a multiplexer.

17. The network of claim 16, wherein the single data channel is de-multiplexed into the multiple data channels via a de-multiplexer.

18. The network of claim 13, wherein the first network device is coupled to the second network device via a docking station, if the first network device is not compatible with the mobile high-definition interface.

19. The network of claim 18, wherein the first network device is coupled to the second network device without the docking station, if the first network device is compatible with the mobile high-definition interface.

20. A computer-implemented method comprising:
merging, via a transmitter, multiple channels of a high-definition interface into a single channel to generate a mobile high-definition interface, the mobile high-definition interface configured to facilitate carrying of high-definition media content in a mobile device; and
receiving, via a receiver coupled with the transmitter, the single channel, and unmerging the single channel into the multiple channels, wherein the receiver includes a decoder configured to perform separate decoding of each of the multiple channels, if the de-multiplexing of the single channel is performed prior to the decoding of the multiple channels.

21. The computer-implemented method of claim 20, wherein the decoder is configured to perform decoding of the single channel, if the de-multiplexing of the single channels is performed after the decoding of the single channel.

22. The computer-implemented method of claim 20, wherein the mobile high-definition interface includes a single control bus representing a Display Data Channel (DDC) bus and a Consumer Electronics Control (CEC) bus.

23. The computer-implemented method of claim 20, wherein the multiple channels are configured to carry audio data, video data, and/or auxiliary data either together or separately, wherein the video data is carried by each of the channels, Horizontal Synchronization (HSYNC) and/or Vertical Synchronization (VSYNC) data is carried by one of the channels, the audio data is carried by multiple channels of the channels, and control packets are carried by multiple channels of the channels over.

24. The computer-implemented method of claim 20, further comprising performing separate decoding of each of the multiple channels, if the de-multiplexing of the single channel is performed prior to the decoding of the multiple channels.

25. The computer-implemented method of claim 24, further comprising performing decoding of the single channel, if the de-multiplexing of the single channels is performed after the decoding of the single channel.

* * * * *